(12) United States Patent
Suzuki

(10) Patent No.: US 8,264,545 B2
(45) Date of Patent: Sep. 11, 2012

(54) ELECTRONIC CAMERA

(75) Inventor: Maki Suzuki, Tokyo (JP)

(73) Assignee: Nikon Corporation, Tokyo (JP)

( * ) Notice: Subject to any disclaimer, the term of this patent is extended or adjusted under 35 U.S.C. 154(b) by 350 days.

(21) Appl. No.: 12/518,601

(22) PCT Filed: Dec. 11, 2007

(86) PCT No.: PCT/JP2007/001379
§ 371 (c)(1),
(2), (4) Date: Jun. 10, 2009

(87) PCT Pub. No.: WO2008/072374
PCT Pub. Date: Jun. 19, 2008

(65) Prior Publication Data
US 2010/0013977 A1    Jan. 21, 2010

(30) Foreign Application Priority Data
Dec. 11, 2006  (JP) .................... 2006-332915

(51) Int. Cl.
H04N 5/225  (2006.01)
H04N 5/222  (2006.01)
G03B 13/00  (2006.01)

(52) U.S. Cl. .................... 348/169; 348/345; 348/333.02
(58) Field of Classification Search .................... None
See application file for complete search history.

(56) References Cited

U.S. PATENT DOCUMENTS
5,739,857 A    4/1998  Kaneda
2001/0012072 A1    8/2001  Ueno
2005/0248681 A1    11/2005  Nozaki et al.
2006/0058604 A1 *    3/2006  Avinash et al. ............... 600/407
2006/0210260 A1 *    9/2006  Yata .............................. 396/147

FOREIGN PATENT DOCUMENTS
| JP | 60-263584 A | 12/1985 |
| JP | 3-259670 A | 11/1991 |
| JP | 06-086140 A | 3/1994 |
| JP | 2000-125178 A | 4/2000 |
| JP | 2001-211351 A | 8/2001 |
| JP | 2005-323015 A | 11/2005 |
| JP | 2006-222979 A | 8/2006 |
| JP | 2006222979 A * | 8/2006 |
| JP | 2006-254129 A | 9/2006 |
| JP | 2006254129 A * | 9/2006 |

* cited by examiner

Primary Examiner — Nhan T Tran
Assistant Examiner — Yih-Sien Kao
(74) Attorney, Agent, or Firm — Arent Fox LLP

(57) ABSTRACT

It is enabled to check a detail of a subject being a tracking object more rapidly and easily by including an image-capturing unit capturing a subject image and generating an image, a selecting unit continuously selecting a focus detection object area at the time of image-capturing by the image-capturing unit based on the image generated by the image-capturing unit, a displaying unit capable of displaying the image generated by the image-capturing unit, a generating unit cutting out a part corresponding to the focus detection object area from the image generated by the image-capturing unit and generating a tracking object checking image, and a controlling unit displaying on the displaying unit by overlapping a through image for a composition checking based on the image generated by the image-capturing unit and the tracking object checking image at the time of image-capturing by the image-capturing unit.

8 Claims, 3 Drawing Sheets

ELECTRONIC CAMERA

CROSS-REFERENCE TO RELATED APPLICATION

This application is a U.S. National Stage application claiming the benefit of prior filed International Application Number PCT/JP2007/001379, filed Dec. 11, 2007, in which the International Application claims a priority date of Dec. 11, 2006, based on prior filed Japanese Application Number 2006-332915, the entire contents of which are incorporated herein by reference.

TECHNICAL FIELD

The present application relates to an electronic camera including a subject tracking function.

BACKGROUND ART

Conventionally, a subject tracking technology originated in Patent Document 1 is considered to perform focus adjustment and a control of exposure conditions while keeping a user intended composition when a subject with relatively large motion (person, animal, vehicle, or the like) is photographed by a camera.

In the subject tracking technology, a main subject is tracked automatically, and the focus adjustment and the control of the exposure conditions are performed centering on the main subject.

Patent Document 1: Japanese Unexamined Patent Application Publication No. S60-263584

DISCLOSURE

Problems to be Solved

However, there is a case when it is difficult for a user to discriminate a subject when the subject being a tracking object is small relative to a whole angle of view. Besides, it becomes further difficult to discriminate the subject when there are plural subjects within the angle of view. In such a case, the user performs a zoom operation (enlargement) to discriminate the subject being the tracking object. However, it becomes impossible to look down upon a whole composition by performing the zoom operation because the angle of view becomes narrow. Namely, the user has to repeatedly perform the zoom operations for enlargement and reduction under a state in which it is necessary to frequently check the subject being the tracking object. In particular, all of the angle of view and composition changes are recorded if the zoom operation as stated above is performed during a moving image photographing. These "unintended angle of view and composition changes" for the user may also be unpleasant for appreciators.

A proposition of an electronic camera of the present application is to enable to check a detail of a subject being a tracking object more rapidly and easily.

Means for Solving Problems

An electronic camera of the present invention includes an image-capturing unit capturing a subject image and generating an image, a selecting unit continuously selecting a focus detection object area at the time of image-capturing by the image-capturing unit based on the image generated by the image-capturing unit, a displaying unit capable of displaying the image generated by the image-capturing unit, a generating unit cutting out a part corresponding to the focus detection object area from the image generated by the image-capturing unit and generating a tracking object checking image, and a controlling unit displaying on the displaying unit by overlapping a through image for a composition checking based on the image generated by the image-capturing unit and the tracking object checking image at the time of image-capturing by the image-capturing unit.

Preferably, the electronic camera may further include an overwatching unit overwatching a selection accuracy of the focus detection object area by the selecting unit, and the controlling unit displays the tracking object checking image when the selection accuracy becomes lower than a predetermined accuracy.

Preferably, the controlling unit may notify a user of the selection accuracy being lower than the predetermined accuracy by performing an alarm display on the displaying unit when the selection accuracy becomes lower than the predetermined accuracy.

Preferably, the controlling unit may display the tracking object checking image at a position not overlapping the focus detection object area.

Preferably, the electronic camera may further include an accepting unit accepting a user instruction designating a position to display the tracking object checking image, and the controlling unit displays the tracking object checking image according to the user instruction.

Preferably, the electronic camera may further include a magnification changing unit changing an imaging magnification of the image-capturing unit by using at least one of an electrical method or an optical method, and the controlling unit displays the tracking object checking image by enlarging or reducing it in accordance with the imaging magnification.

Preferably, the electronic camera may further include an accepting unit accepting a user instruction designating an enlarging magnification of the tracking object checking image, and the controlling unit displays the tracking object checking image by enlarging or reducing it according to the user instruction.

Preferably, the electronic camera may further include a recording unit recording by associating the image generated by the image-capturing unit and positional information indicating a position of the focus detection object area at the time of image-capturing, and an accepting unit accepting a user instruction to display the image recorded in the recording unit on the displaying unit, and the generating unit generates the tracking object checking image by cutting out a part corresponding to the focus detection object area from the image based on the positional information when the user instruction is accepted, and the controlling unit displays on the displaying unit by overlapping the image and the tracking object checking image when the user instruction is accepted.

Preferably, the electronic camera may further include a creating unit creating an overlapped image by overlapping the image generated by the image-capturing unit and the tracking object checking image, and a recording unit recording the overlapped image.

Effect

According to an electronic camera of the present invention, it is possible to check a detail of a subject being a tracking object more rapidly and easily.

DETAILED DESCRIPTION OF THE EMBODIMENTS

Figure 1:
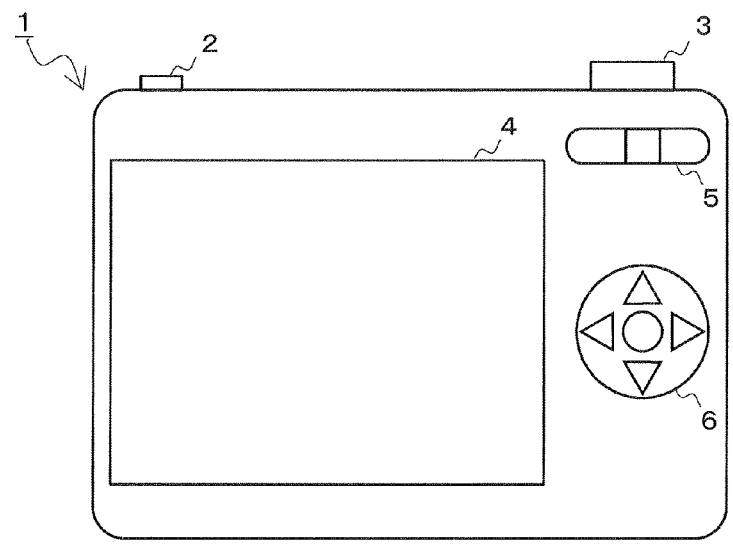
FIG. 1 is a rear external view of an electronic camera 1.

Hereinafter, embodiments of the present invention are described. An electronic camera 1 of the embodiment includes a power button 2 and a release button 3 at an upper surface thereof as illustrated in a rear external view in FIG. 1. Besides, the electronic camera 1 includes a liquid crystal display 4, a zoom button 5 and a cross button 6 at a rear surface thereof. The electronic camera 1 may include a menu button, a mode selection button, a play button, a wastebasket button, and so on in addition to the above.

Figure 2:
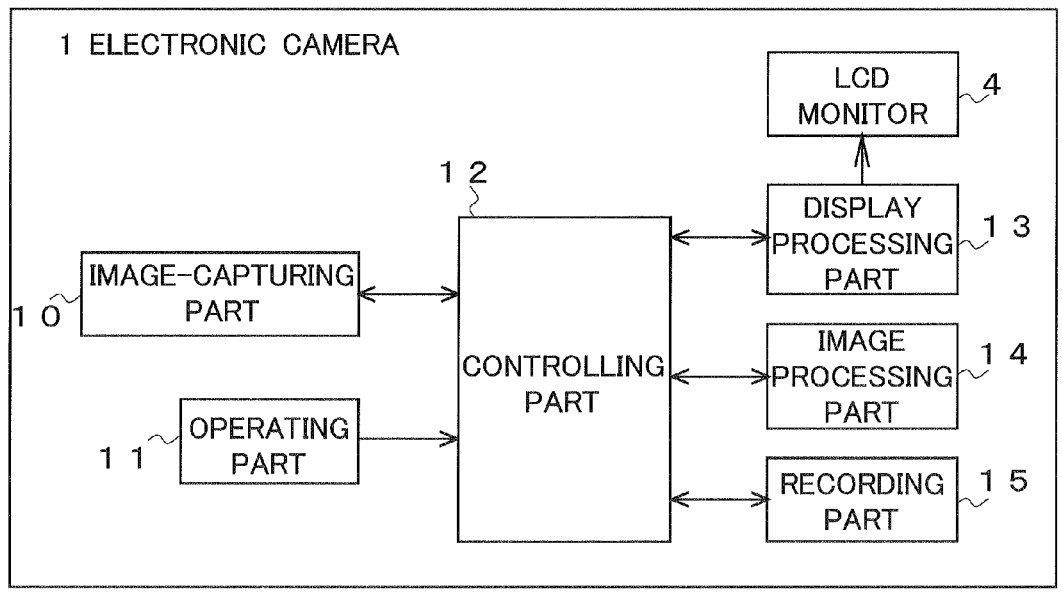
FIG. 2 is a functional block diagram of the electronic camera 1.

FIG. 2 is a functional block diagram of the electronic camera 1. As illustrated in FIG. 2, the electronic camera 1 has an image-capturing unit 10 including a not-illustrated photographic lens, image-capturing sensor, and so on, an operation unit 11 including the power button 2, the release button 3, the zoom button 5, the cross button 6, and so on, a controlling unit 12 controlling respective units, a display processing unit 13 controlling display contents of the liquid crystal display 4, an image processing unit 14 performing an image processing for image data obtained by the image-capturing unit 10, a recording unit recording the image data, and so on.

In FIG. 2, the image-capturing unit 10, the display processing unit 13, the image processing unit 14 and the recording unit 15 are mutually coupled to the controlling unit 12. Besides, a state of the operation unit 11 is detected by the controlling unit 12, and an output of the display processing unit 13 is coupled to the liquid crystal display 4.

The electronic camera 1 having the constitution as stated above includes a subject tracking function to perform focus adjustment and a control of exposure conditions while keeping a composition intended by a user. A detail of the subject tracking function is not given because it is similar to a publicly known art. Further, the electronic camera 1 has two modes, namely a photographing mode including a moving image photographing and a still image photographing, and a reproducing mode reproducing images recorded at the recording unit 15. In the photographing mode, the controlling unit 12 generates images by controlling the image-capturing unit 10, and displays a through image for a composition checking on the liquid crystal display 4 by controlling the display processing unit 13 and the image processing unit 14 based on the generated images. On the other hand, in the reproducing mode, the controlling unit 12 reads a reproduction object image from the recording unit 15, and displays on the liquid crystal display 4 by controlling the display processing unit 13 and the image processing unit 14.

Incidentally, the above-stated turning ON/OFF of the subject tracking function and a selection of the photographing mode or the reproducing mode are performed by a user instruction via the operation unit 11.

Figure 3:
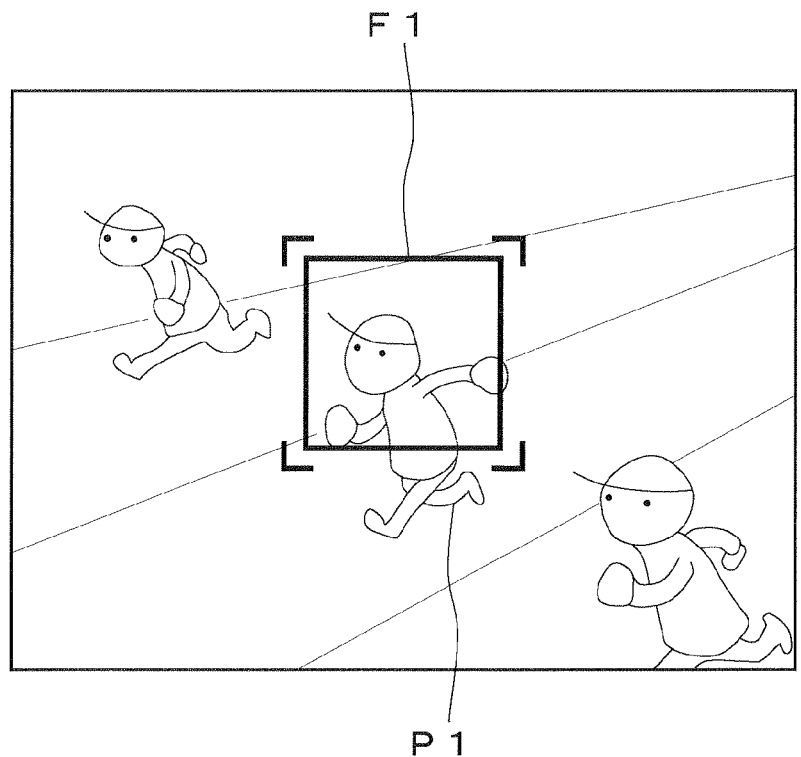
FIG. 3 is a view explaining a selection of a subject being a tracking object.

When the subject tracking function is turned ON under a state in which the electronic camera 1 is set at the photographing mode, the controlling unit 12 detects the instruction, and prompts the user to select a subject being a tracking object as an initial setting. Hereinafter, a case when a person P1 illustrated in FIG. 3 is selected as the tracking object is explained as an example. This selection is performed via the operation unit 11. The controlling unit 12 accepts the user instruction selecting the tracking object, then detects the instruction, and displays a tracking object frame F1 on the liquid crystal display 4 by controlling the display processing unit 13. After that, a tracking object checking image is displayed to overlap with the through image displayed on the liquid crystal display 4 at a later-described display timing.

Figure 4:
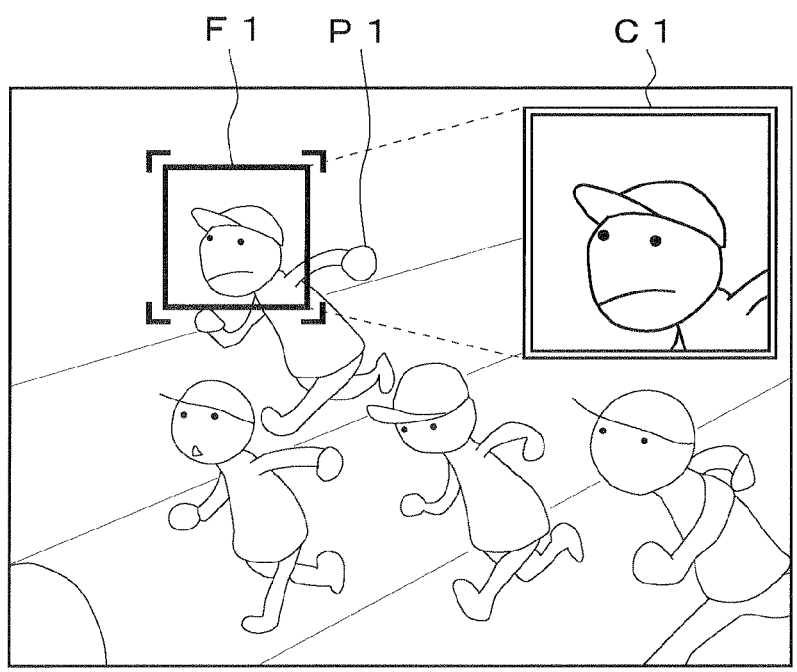
FIG. 4 is a view explaining a tracking object checking image.

The tracking object checking image is an image partially enlarging a subject being a tracking object. An example is illustrated in FIG. 4. In FIG. 4, a partial enlarged image C1 of the person P1 being the tracking object is the tracking object checking image. As a creation method of this image, for example, there are two kinds of methods as described below. One is a method cutting out a part of the through image and digitally enlarging it. In this method, there is a possibility in which image quality decreases to some extent resulting from the digital enlargement, but it is possible to obtain an image enough for the check of the tracking object, and to suppress a process load required for the creation. The other is a method creating the tracking object checking image in addition to the through image in accordance with a resolution of the image-capturing sensor of the image-capturing unit 10. For example, when the resolution of the liquid crystal display 4 is a VGA size (640×480 pixel), and moving image acquisition ability of the image-capturing sensor is further high definition, (for example, equivalent to twice of the VGA=1280×960 pixel), the through image is generated by a reduction processing. Accordingly, the high definition image obtained by the image-capturing sensor is used as the tracking object checking image as it is, without reducing it.

Besides, when the tracking object checking image is displayed to overlap with the through image, it may be overlapped by an embedding synthesis or by an addition synthesis. When it is overlapped by the embedding synthesis, display accuracy improvement of the tracking object checking image can be achieved. Besides, when it is overlapped by the addition synthesis, it is possible to continuously display all of the through image.

The controlling unit 12 starts the display of the tracking object checking image on the liquid crystal display 4 at any of the timings described below.

(1) Constantly display after the initial setting of the tracking object.

The controlling unit 12 starts the display of the tracking object checking image when the initial setting of the subject tracking function is performed by the user.

(2) Display when a selection accuracy of the tracking object decreases lower than a predetermined accuracy.

The controlling unit 12 monitors a selection accuracy of the tracking object, and starts the display of the tracking object checking image when the selection accuracy decreases lower than a predetermined accuracy. The selection accuracy of the tracking object may be asked by a difference in a pattern matching when the tracking object is selected by, for example, a pattern matching technology. Incidentally, the selection accuracy of the tracking object is considered to decrease, for example, when the subject of the tracking object turns around, when the subject of the tracking object and the other subject cross each other, and so on.

When the selection accuracy decreases lower than the predetermined accuracy, it is possible to notify the user that the selection accuracy decreases lower than the predetermined accuracy by displaying the tracking object checking image.

Figure 5:
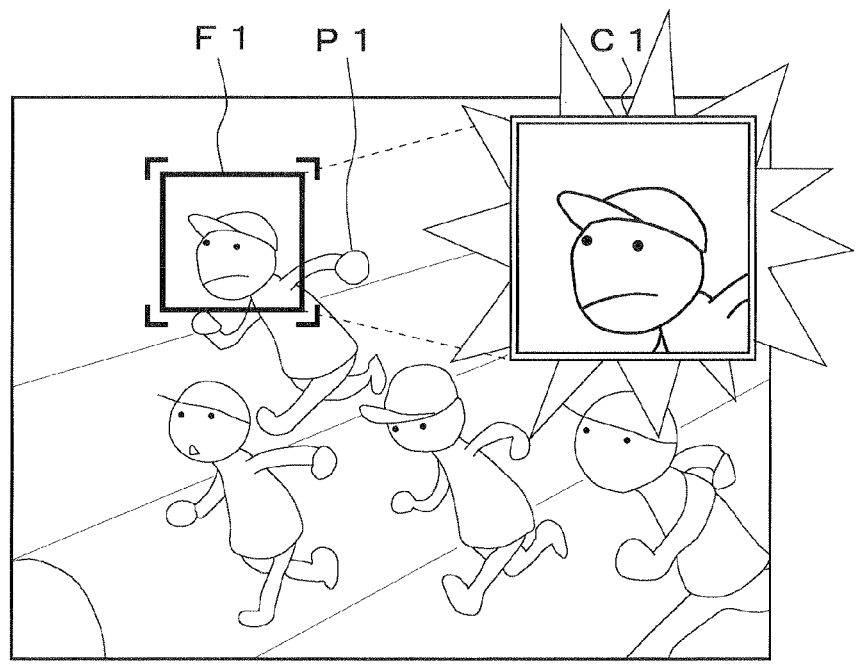
FIG. 5 is a view explaining an alarm display.

Further, the controlling unit 12 may perform an alarm display on the liquid crystal display 4 to notify the user that the selection accuracy decreases lower than the predetermined accuracy. The alarm display is performed by, for example, blinking a frame of the enlarged image C1 or changing a color of the frame as illustrated in FIG. 5. Besides, an error message indicating that the selection accuracy decreases lower than the predetermined accuracy may be displayed.

Besides, the alarm display may be changed in stages in accordance with a degree of the selection accuracy.

(3) Display when a size of the tracking object becomes smaller than a predetermined size.

The controlling unit 12 starts the display of the tracking object checking image when a size of the subject selected as the tracking object becomes smaller than a predetermined size in the through image. The size of the tracking object may be asked by, for example, an area ratio of the size of the tracking object relative to the size of the through image. The tracking object checking image is displayed when this area ratio becomes smaller than a predetermined value. Incidentally, it is conceivable that the size of the tracking object becomes small, for example, when the tracking object steps away, when a zoom operation is performed by the user, or the like.

When the size of the tracking object becomes smaller than the predetermined size, a visibility support by the user is enabled by displaying the tracking object checking image.

(4) Display according to an user instruction.

When the user instruction via the operation unit 11 is accepted, the controlling unit 12 detects it, and starts the display of the tracking object checking image.

After the display of the tracking object checking image is started as it is described from (1) to (4), it may have a constitution in which the display of the tracking object checking image is performed continuously, a constitution in which the display is terminated automatically after a given period of time, or a constitution in which the display is terminated according to the user instruction. Besides, it is preferable to make any of the above selectable by the user.

The controlling unit 12 determines a position where the tracking object checking image is displayed on the liquid crystal display 4 by any of the methods described below.

(1) Display at a fixed position.

The controlling unit 12 displays the tracking object checking image at a position determined in advance (for example, at an upper right portion).

(2) Display at a position where the tracking object image does not overlap with a tracking object frame.

Figure 6:
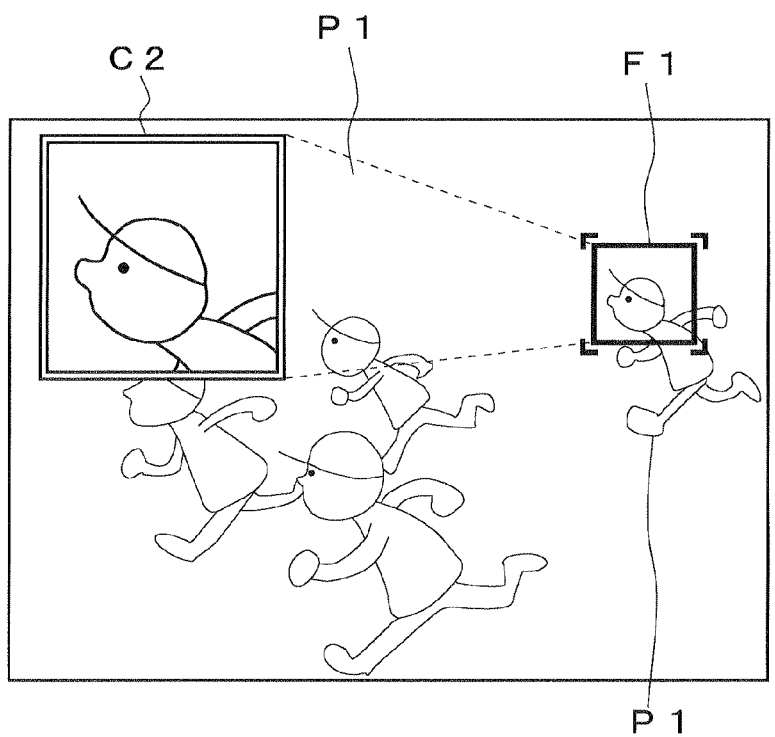
FIG. 6 is a view explaining a display position of the tracking object checking image.

The controlling unit 12 displays the tracking object checking image at the position where it does not overlap with a tracking object frame. For example, when the subject changes (moves) from a state described in FIG. 4 to become a state illustrated in FIG. 6, the enlarged image C1 illustrated in FIG. 4 and the tracking object frame F1 are overlapped. Accordingly, the controlling unit 12 displays an enlarged image C2 at a position where it does not overlap with the tracking object frame F1 as illustrated in FIG. 6.

As stated above, it is possible for the user to simultaneously perform the checking of the tracking object and the checking of the angle of view (composition), by displaying the tracking object checking image at the position where it does not overlap with the tracking object frame.

(3) Display at a position designated by the user instruction.

When the user instruction via the operation unit 11 is accepted, the controlling unit 12 detects it, and determines a position where the tracking object checking image is displayed according to the user instruction. The user determines the position where the tracking object checking image is displayed by operating, for example, the cross button 6.

The controlling unit 12 displays the tracking object checking image on the liquid crystal display 4 by enlarging or reducing it with any of magnifications described below.

(1) Display with a fixed magnification.

The controlling unit 12 displays the tracking object checking image with a magnification determined in advance (for example, double, triple, and so on).

(2) Display by enlarging or reducing in accordance with an imaging magnification.

The controlling unit 12 displays the tracking object checking image by enlarging or reducing it in accordance with an imaging magnification (including at least one of an optical zoom magnification or a digital zoom magnification) by the electronic camera 1.

The tracking object checking image is enlarged or reduced to be displayed in accordance with the imaging magnification, and thereby, the preferable visibility support for the user can be enabled, because it is possible to suppress a significant change of the size of the subject in the tracking object checking image.

(3) Display by enlarging or reducing according to the user instruction.

When the user instruction via the operation unit 11 is accepted, the controlling unit 12 detects it, and displays the tracking object checking image by enlarging or reducing it according to the user instruction. The user determines a display magnification of the tracking object checking image by operating, for example, the cross button 6. Incidentally, a switching operation and so on may be combined when the cross button 6 is also used for the determination of the position where the above-stated tracking object checking image is displayed.

The controlling unit 12 records information relating to the tracking object checking image by using any of the methods described below.

(1) Records while establishing an association between the generated image and positional information of the tracking object.

The controlling unit 12 records the image generated by the image-capturing unit 10 and positional information of the subject of the tracking object at the image-capturing time of the image to the recording unit 15 while establishing an association between them. When reproduction of the image is performed in a reproducing mode, the image and the positional information are read from the recording unit 15, an image similar to the tracking object checking image is generated based on the positional information, and thereafter, the image to be reproduced and the tracking object checking image are overlapped to be displayed on the liquid crystal display 4.

The user is easily able to check a detail of the subject of the tracking object at the time when the reproducing image is captured by performing the display as stated above. Incidentally, whether the overlapped display is performed or not in the reproducing mode may be made selectable by the user.

Only the tracking object frame (refer to the tracking object frame F1 in FIG. 4 to FIG. 6) may be displayed to overlap with the reproducing image instead that the image to be reproduced and the tracking object checking image are overlapped to be displayed in the reproducing mode. The user is easily able to check the subject of the tracking object at the time when the reproducing image is captured without disturbing the display of the image to be reproduced by performing the display as stated above.

The positional information of the tracking object and a face detecting technology being a publicly known technology may be combined in the reproducing mode. For example, a face detection is performed for the image similar to the tracking object checking image generated based on the positional information of the tracking object, only a face portion is enlarged, and thereafter, it may be displayed on the liquid crystal display 4 to overlap with the image to be reproduced. Besides, a checking image based on a face detection result may be generated in addition to the tracking object checking image, and this checking image may be displayed on the liquid crystal display 4 to overlap with the image to be reproduced. It is possible to certainly display the face portion of the subject even when the positional information of the tracking object does not correspond to the face portion of the subject (for example, when the positional information corresponds to a body or the like) by performing the display as stated above.

When the generated image is a moving image, a skip reproduction may be performed based on the positional information of the tracking object in the reproducing mode. For example, it may have a constitution in which a portion where the positional information of the tracking object does not exist within the moving image is regarded that a main subject does not exist, and this portion is skipped to be reproduced. In this case, it is preferable that a natural reproduction is performed so as not to give the user uncomfortable feeling by using fade-in, fade-out technologies, and so on.

A thumbnail image for a list display may be generated based on the positional information of the tracking object. A probability that the tracking object equal to the main subject is high, and therefore, it becomes easy for the user to grasp contents of the image by generating and using the thumbnail image based on the positional information of the tracking object. Further, it may have a constitution in which the above-stated tracking object checking image is appropriately reduced to be used as the thumbnail image.

The positional information of the tracking object may be used when another image is displayed on the image to be reproduced by the embedding synthesis in the reproducing mode. For example, when a moving image captured by another electronic camera and so on is commonly used by the electronic camera 1 by using radio and so on, the commonly used image is displayed at a position where the tracking object is not overlapped based on the positional information of the tracking object. The probability that the tracking object is the main subject is high, and therefore, it is possible for the user to visually recognize both the main subject and the commonly used image by performing the display as stated above.

(2) Create and record an overlapped image.

The controlling unit 12 creates an overlapped image in which the image generated by the image-capturing unit 10 and the above-stated tracking object checking image are overlapped and records it to the recording unit 15. When the reproduction of the overlapped image is performed in the reproducing mode, the overlapped image is read from the recording unit 15 and displayed on the liquid crystal display 4.

It is possible for the user to easily check a detail of the subject of the tracking object at the time when the reproducing image is captured by performing the display as stated above. Incidentally, whether the overlapped image is to be created or not may be made selectable by the user.

A part or all of the processing relating to the tracking described in the above-stated photographing mode may be made executable also in the reproducing mode. It becomes possible to set a subject other than the subject at the photographing time as the tracking object in the reproducing mode by having the constitution as stated above.

MODIFICATION EXAMPLE

The liquid crystal display 4 may be made up of a touch panel mode monitor including display elements such as a TFT liquid crystal. In this case, the user is able to conduct various selection and so on by getting in touch with the liquid crystal display 4 with a finger, a touch pen, or the like.

In this case, for example, the selection of a portion which is desired to be selected as the tracking object can be easily performed on the liquid crystal display 4 at the initial setting time of the tracking object. Besides, a display start instruction of the tracking object checking image, the determination of the display position, and the determination of the display magnification can also be performed easily on the liquid crystal display 4 as same as the above. For example, the determination (change) of the display position may be performed by dragging the tracking object frame on the liquid crystal display 4.

As it is described hereinabove, according to the present embodiment, an image-capturing unit capturing a subject image and generating an image, a selecting unit continuously selecting a focus detection object area at an image-capturing time by the image-capturing unit based on the image generated by the image-capturing unit, a displaying unit capable of displaying the image generated by the image-capturing unit and a generating unit generating a tracking object checking image by cutting out a portion corresponding to the focus detection object area from the image generated by the image-capturing unit are included, and a through image for a composition checking based on the image generated by the image-capturing unit and the tracking object checking image are overlapped to be displayed on the displaying unit at the image-capturing time by the image-capturing unit. Accordingly, a user is able to check a detail of a subject being a tracking object more quickly and easily by visually observing this displaying unit.

Incidentally, in the present embodiment, it is described by using the electronic camera 1 including the liquid crystal display 4 at the rear surface thereof, but it is possible to similarly apply the present invention to an electronic camera in a single lens reflex type and including a displaying unit capable of displaying a through image for the composition checking (so called as an "electronic view finder").

In the present embodiment, an example in which the through image and the tracking object checking image are overlapped to be displayed is provided, but it may have a constitution in which the through image and the tracking object checking image are displayed by switching them.

The application described in the present invention can be similarly applied both at a moving image photographing time and at a still image photographing time.

In the present embodiment, it is described that the tracking object is one subject, but the present invention can be similarly applied to a case when plural subjects are the tracking objects. For example, the display of the tracking object checking image described in the present embodiment is very effective when the plural subjects are tracking object candidates, and any of the subjects is to be selected by the user.

Resetting of the tracking object may be performed by combining with the display of the tracking object checking image described in the present embodiment. For example, the resetting of the tracking object may be enabled when a predetermined operation is accepted via the operation unit 11 under a state in which the tracking object checking image is displayed. Besides, when the monitor is the above-stated touch panel type monitor, the resetting of the tracking object may be enabled by selecting an arbitrary position on the monitor under the state in which the tracking object is displayed.

The many features and advantages of the embodiments are apparent from the detailed specification and, thus, it is intended by the appended claims to cover a II such features and advantages of the embodiments that fall within the true spirit and scope thereof. Further, since numerous modification and changes will readily occur to those skilled in the art, it is not desired to limit the inventive embodiments to exact construction and operation illustrated and described, and accordingly all suitable modifications and equilavents may be resorted to, falling within the scope thereof.

The art described in the present embodiment can be similarly applied to an electronic camera housed in a cellular phone, a computer, and so on.

The invention claimed is:

1. An electronic camera, comprising:
an image-capturing unit capturing a subject image and generating an image;
a selecting unit continuously selecting a focus detection object area at a time of image-capturing by the image-capturing unit based on the image generated by the image-capturing unit;
a displaying unit capable of displaying the image generated by the image-capturing unit;
a generating unit cutting out a part corresponding to the focus detection object area from the image generated by the image-capturing unit and generating a tracking object checking image;
an overwatching unit overwatching a selection accuracy of the focus detection object area selected by the selecting unit; and
a controlling unit displaying on the displaying unit by overlapping a through image generated by the image-capturing unit and the tracking object checking image at the time of image-capturing by the image-capturing unit, and only displaying the tracking object checking image when the selection accuracy becomes lower than a predetermined accuracy.

2. The electronic camera according to claim 1, wherein the controlling unit notifies a user of the selection accuracy being lower than the predetermined accuracy by performing an alarm display on the displaying unit when the selection accuracy becomes lower than the predetermined accuracy.

3. The electronic camera according to claim 1, wherein the controlling unit displays the tracking object checking image at a position not overlapping the focus detection object area.

4. The electronic camera according to claim 1, further comprising
an accepting unit accepting a user instruction designating a position to display the tracking object checking image, wherein
the controlling unit displays the tracking object checking image according to the user instruction.

5. The electronic camera according to claim 1, further comprising
a magnification changing unit changing an imaging magnification of the image-capturing unit by using at least one of an electrical method and an optical method, wherein
the controlling unit displays the tracking object checking image by enlarging or reducing the tracking object checking image in accordance with the imaging magnification.

6. The electronic camera according to claim 1, further comprising
an accepting unit accepting a user instruction designating an enlarging magnification of the tracking object checking image, wherein
the controlling unit displays the tracking object checking image by enlarging or reducing the tracking object checking image according to the user instruction.

7. The electronic camera according to claim 1, further comprising:
a recording unit recording by associating the image generated by the image-capturing unit and positional information indicating a position of the focus detection object area at the time of image-capturing; and
an accepting unit accepting a user instruction to display the image recorded in the recording unit on the displaying unit, wherein
the generating unit generates the tracking object checking image by cutting out a part corresponding to the focus detection object area from the image based on the positional information when the user instruction is accepted, and
the controlling unit displays on the displaying unit by overlapping the image and the tracking object checking image when the user instruction is accepted.

8. The electronic camera according to claim 1, further comprising:
a creating unit creating an overlapped image by overlapping the image generated by the image-capturing unit and the tracking object checking image; and
a recording unit recording the overlapped image.

* * * * *